(12) United States Patent
Seki et al.

(10) Patent No.: US 10,248,893 B2
(45) Date of Patent: Apr. 2, 2019

(54) PRINT CONTROL DEVICE FOR TRACKING PRINTING INFORMATION AND METHOD FOR PERFORMING THE SAME

(71) Applicant: Seiko Epson Corporation, Tokyo (JP)

(72) Inventors: Kenta Seki, Matsumoto (JP); Hiroyuki Tsuji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/446,771

(22) Filed: Mar. 1, 2017

(65) Prior Publication Data
US 2017/0286813 A1 Oct. 5, 2017

(30) Foreign Application Priority Data
Mar. 29, 2016 (JP) .................... 2016-065200

(51) Int. Cl.
*G06F 3/12* (2006.01)
*G06K 15/02* (2006.01)
*G06K 15/10* (2006.01)
*G06K 15/00* (2006.01)

(52) U.S. Cl.
CPC ....... *G06K 15/1823* (2013.01); *G06K 15/102* (2013.01); *G06K 15/1802* (2013.01); *G06K 15/1827* (2013.01); *G06K 15/402* (2013.01)

(58) Field of Classification Search
None
See application file for complete search history.

(56) References Cited

U.S. PATENT DOCUMENTS

| 2007/0201091 | A1* | 8/2007 | Tanaka | G06F 3/1204 358/1.16 |
| 2012/0059990 | A1* | 3/2012 | Iida | G06F 11/1084 711/114 |
| 2012/0327463 | A1* | 12/2012 | Mizuno | G06F 3/122 358/1.15 |
| 2013/0070296 | A1* | 3/2013 | Ishibashi | G06F 3/1207 358/1.15 |
| 2016/0062658 | A1* | 3/2016 | Urata | G06F 3/0604 711/114 |
| 2016/0299798 | A1* | 10/2016 | Bhattacharjee | G06F 3/0622 |

FOREIGN PATENT DOCUMENTS

JP 2003-323270 A 11/2003

* cited by examiner

*Primary Examiner* — Henok Shiferaw
(74) *Attorney, Agent, or Firm* — Nutter McClennen & Fish LLP; Alex Nagorniy

(57) ABSTRACT

A print control device includes a control unit configured to acquire print image data from a storage device according to a print request and to cause a printer 100 which is configured to execute printing based on the print image data to execute the printing, wherein the control unit acquires from the storage device, operation status information of the storage device storing the print image data and attribute information of the print image data stored in the storage device and enables the operation status information and the attribute information to be displayed on a display unit.

11 Claims, 6 Drawing Sheets

FIG. 4

| PRINTING APPARATUS NAME:LFP-10000 | | | | STATUS: PRINTABLE | | MEDIA:KA*PSKR | | REMAINING AMOUNT:25.0 m | | |
|---|---|---|---|---|---|---|---|---|---|---|
| JOB | NAME | STATUS | NUMBER OF COPIES | COMPLETED | REQUIRED TIME | REMAINING TIME | MEDIA | | | |
| 01 | BBB123 | PRINTING | 300 | 198 | 2.5 h | 0.8 h | KA*PSKR | [PRINT] | [CANCEL] |
| 02 | BBB345 | PRINT WAITING | 20 | — | 0.5 h | — | KA*PSKR | [PRINT] | [CANCEL] |
| 03 | CCC345 | NG | 20 | — | 0.5 h | — | MCPM*R1 | [PRINT] | [CANCEL] |
| 04 | ABC001 | NG | 35 | — | 1.2 h | — | KHS*PSK | [PRINT] | [CANCEL] |
| 05 | DEF001 | OK | 68 | — | 2.6 h | — | KA*PSKR | [PRINT] | [CANCEL] |

| | | | | | | | | |
|---|---|---|---|---|---|---|---|---|
| PRINTING APPARATUS NAME:LFP-10000 | | | STATUS: PRINTABLE | | MEDIA:KA*PSKR | | | REMAINING AMOUNT:25.0 m |
| JOB | NAME | STATUS | NUMBER OF COPIES | COMPLETED | REQUIRED TIME | REMAINING TIME | MEDIA | |
| 03 | CCC345 | NG | 20 | — | 0.5 h | — | MCPM-R1 | PRINT CANCEL |

| # | STORAGE | ACCESS | OK % | CAPACITY | REMAINING CAPACITY | USAGE RATIO % | PRODUCT NUMBER |
|---|---|---|---|---|---|---|---|
| ☐ | ST01 | OK | 100 | 10 TB | 2 TB | 20 | 112233 |
| ☑ | ST02 | NG | 37 | 10 TB | 4 TB | 40 | 223344 |
| ☐ | ST03 | OK | 98 | 20 TB | 10 TB | 50 | 445566 |
| ☐ | ST04 | OK | 100 | 10 TB | 1 TB | 10 | 667788 |
| ☐ | ST05 | NG | 62 | 0.5 TB | 0.1 TB | 20 | 456781 |
| ☐ | ST06 | OK | 99 | 10 TB | 0 | 0 | 247432 |

FILE NAME:IMAGE01  [ACQUISITION SOURCE] [        ]

FILE TYPE:GP  [SAVE DESTINATION] [        ]  [SAVE] [CANCEL]

PRINT CONTROL DEVICE FOR TRACKING PRINTING INFORMATION AND METHOD FOR PERFORMING THE SAME

BACKGROUND

1. Technical Field

The present invention relates to a print control device, a printing apparatus including the print control device, and a print control method.

2. Related Art

As the technology of ink jet printers serving as printing apparatuses advances, the definition and the quality of print images increase, the format of the print images becomes wider, and the size of image data to be printed and the size of print data (data enabling the ink jet printers to perform printing) based on the image data are increasing. This increases workload (time loss) in image data processes (a generation process of print data and a transmission process of the print data to a printing apparatus) performed each time printing is performed. For this reason, an increasing number of printing apparatuses are configured such that image data and print data which may be reused are stored and registered in the printing apparatuses in order to reduce the workload in reusing the image data and the print data, for example, to perform reprinting. In the reprinting, a print request can be made by specifying the registered data (the image data and the print data) without performing processes on the image data and the print data.

JP-A-2003-323270 proposes a printing system in which a reprint request file including identification information enabling a link to print data at a save destination is created in advance, and in response to a reprint request, reprinting is performed through file manipulation of the reprint request file. This printing system enables reprinting through the file manipulation of the reprint request file without reviewing an identification information list of the print data stored in a storage unit included in the printing apparatus.

However, the printing system described in JP-A-2003-323270 has a problem that a print request through the manipulation of the reprint request file may not be smoothly made when a plurality of storage media connected to a network are configured as a storage unit disposed in the printing apparatus to flexibly handle more pieces of data (image data and print data) and more print requests, or to effectively utilize resources. Specifically, the problem is that when data associated with the link in the reprint request file is inaccessible, printing according to the print request can no longer be performed, but at the time of making the print request, it cannot be determined whether or not the printing according to the print request can be performed. For example, a user does not know that printing cannot be performed until an error is notified in response to the print request. In other words, a user does not know the situation until printing is attempted. Data associated with the link in the reprint request file is inaccessible, for example, when network attached storage (NAS) in which data (image data and print data) has been registered is not activated, or when specified data (image data and print data) has been changed and it is no longer possible to access an expected link destination.

SUMMARY

An advantage of some aspects of the invention is that at least some of the above problems can be solved and the invention can be implemented as the following application examples or aspects.

First Application Example

A print control device according to the present application example includes a control unit configured to acquire print image data from a storage device according to a print request and to cause a print unit which performs printing based on the print image data to perform the printing, wherein the control unit acquires from the storage device, operation status information of the storage device storing the print image data and attribute information of the print image data stored in the storage device and enables the operation status information and the attribute information to be displayed on a display unit.

According to the present application example, the control unit acquires from the storage device, operation status information of the storage device storing the print image data and attribute information of the print image data stored in the storage device and enables the operation status information and the attribute information to be displayed on a display unit. Therefore, displaying these pieces of information on the display unit and referencing these pieces of information enable determination of whether or not the print image data can be acquired and whether or not the print image data to be acquired is desired data. That is, it is possible to determine whether or not printing can be performed based on the desired print image data. Before printing is performed, a user is informed of whether or not the printing can be performed based on the print request, which improves the convenience of the user.

Second Application Example

In the print control device according to the application example, the control unit changes based on the operation status information, a mode of the operation status information to be displayed on the display unit.

According to the present application example, the control unit changes based on the operation status information, a mode of the operation status information to be displayed on the display unit. Therefore, information about, for example, whether or not the print image data can be acquired becomes more legible, which improves the convenience of a user.

Third Application Example

In the print control device according to the application example, when the control unit displays the attribute information of the print image data stored in the storage device on the display unit, the control unit compares the attribute information with attribute information of the print image data at the time of storing the print image data in the storage device, and when a difference is found, the control unit displays a warning on the display unit.

According to the present application example, when the control unit displays the attribute information of the print image data on the display unit, the control unit compares the attribute information (the attribution information of print image data stored in the storage device) with attribute information of the print image data at the time of storing the print image data in the storage device, and when a difference is found, the control unit displays a warning on the display unit. That is, a warning is displayed, for example, when the print image data has been changed. Therefore, before printing is performed, an appropriate determination on the printing can be made, which improves the convenience of a user.

Fourth Application Example

The print control device according to the application example further includes a storage unit, wherein the control unit stores in the storage unit, access success/failure information regarding access to the storage device and obtained by communication with the storage device, and when the control unit displays the operation status information of the storage device on the display unit, the control unit displays access success/failure history information based on the access success/failure information.

According to the present application example, when the control unit displays the operation status information of the storage device on the display unit, the control unit displays access success/failure history information based on the success/failure information about access to the storage device. Therefore, before printing is performed, an improvement, for example, changing a storage device for storing the print image data to a more stably operating storage device, can be made so as to stably perform the printing.

Fifth Application Example

In the print control device according to the application example, when the print unit is caused to perform printing based on the print image data including pieces of print image data specified by the print request, if the pieces of print image data include print image data which cannot be acquired, the control unit displays on the display unit, a choice of whether or not to cause the print unit to perform the printing except for the print image data which cannot be acquired.

According to the present application example, when the print unit is caused to perform printing based on the print image data including pieces of print image data specified by the print request, if the pieces of print image data include print image data which cannot be acquired, the control unit displays on the display unit, a choice of whether or not to cause the print unit to perform the printing except for the print image data which cannot be acquired. Therefore, printing unexpected by a user (printing an image with some parts of the image unexpectedly excluded) is no longer performed, and it is also possible to support a case where a user wishes to cause the print unit to perform printing even when some parts of the image is not to be printed. This improves the convenience of a user.

Sixth Application Example

In the print control device according to the application example, when the storage device for storing the print image data is changed, the control unit records in the storage device before the change, link information enabling access to a change destination storage device.

According to the present application example, when the storage device for storing the print image data is changed, the control unit records in the storage device before the change, link information enabling access to a change destination storage device. Therefore, even when the storage device for storing the print image data is changed, such a change does not affect printing according to another print request for printing by specifying the print image data.

Seventh Application Example

In the print control device according to the application example, the control unit updates based on the link information, address information of the storage device for storing the print image data included in the print request to address information of the change destination storage device.

According to the present application example, the control unit updates based on the link information allowing access to the change destination storage device, address information of the storage device for storing the print image data included in the print request to address information of the change destination storage device. Therefore, the information of the print request can be changed to appropriate contents without making a user conscious of it.

Eighth Application Example

A print control method according to the present application example includes acquiring pieces of operation status information of storage devices in which pieces of print image data specified by print requests are stored and pieces of attribute information of the pieces of print image data from the storage devices, and displaying the operation status information and the attribute information for each of the pieces of print image data on a display unit.

According to the present application example, the operation status information of the storage device in which the print image data specified by the print request and the attribute information of the print image data stored in the storage device are displayed on the display unit. Therefore, by referencing these pieces of information, it is possible to determine whether or not the print image data can be acquired and whether or not the print image data to be acquired is desired data. That is, it is possible to determine whether or not printing can be performed based on the desired print image data. Before printing is performed, a user is informed of whether or not the printing can be performed based on the print request, which improves the convenience of the user.

Ninth Application Example

A printing apparatus according to the present application example includes a print unit configured to perform printing based on print image data obtained from a storage device according to a print request, and the print control device described in any one of the application example.

According to the present application example, before printing is performed, a user is informed of whether or not the printing can be performed based on the print request, which improves the convenience of the user.

BRIEF DESCRIPTIONS OF THE DRAWINGS

The invention will be described with reference to the accompanying drawings, wherein like numbers reference like elements.

FIG. 4 is a view conceptually illustrating an example of a list of print requests displayed on a display unit.

FIG. 5 is a view conceptually illustrating an example of a property screen of the print requests.

FIG. 8 is a view conceptually illustrating an example of a screen on which storage devices are displayed so as to be selectable by a user.

DESCRIPTION OF EXEMPLARY EMBODIMENTS

An exemplary embodiment of the present invention will hereinafter be described with reference to the drawings. The following embodiment is exemplary and does not limit the invention. For ease of description, there may be a case where each of the drawings is illustrated at a scale different from the actual scale. In the coordinates illustrated in the figures, the Z-axis direction is the up-down direction, the positive Z direction is the upward direction, the X-axis direction is the front-rear direction, the negative direction is the front direction, the Y-axis direction is the right-left direction, the positive Y direction is the left direction, and the X-Y plane is the horizontal plane.

First Embodiment

Printing Apparatus

Figure 1:
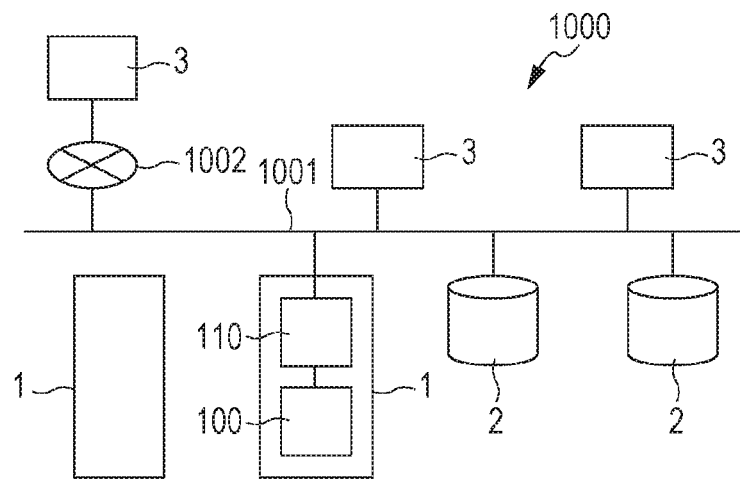
FIG. 1 is a block diagram illustrating a print system including printing apparatuses according to a first embodiment.

FIG. 1 is a block diagram illustrating a print system 1000 including printing apparatuses 1 according to a first embodiment.

The printing system 1000 includes printing apparatuses 1, storage devices 2, personal computers 3 (hereinafter referred to as PCs 3), and other components which are connected to each other via a private network 1001 such as an intranet and/or a public network 1002 such as the Internet. In the printing system 1000, a plurality of printing apparatuses 1, a plurality of storage devices 2, and a plurality of PCs 3 can be connected.

Figure 2:
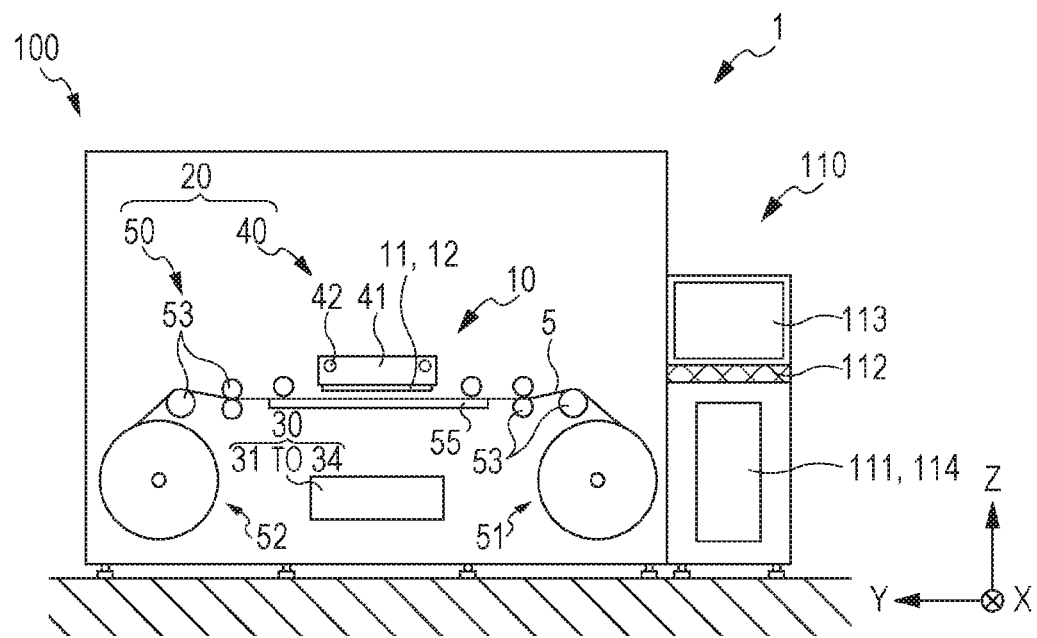
FIG. 2 is a front view illustrating the configuration of the printing apparatus.
Figure 3:
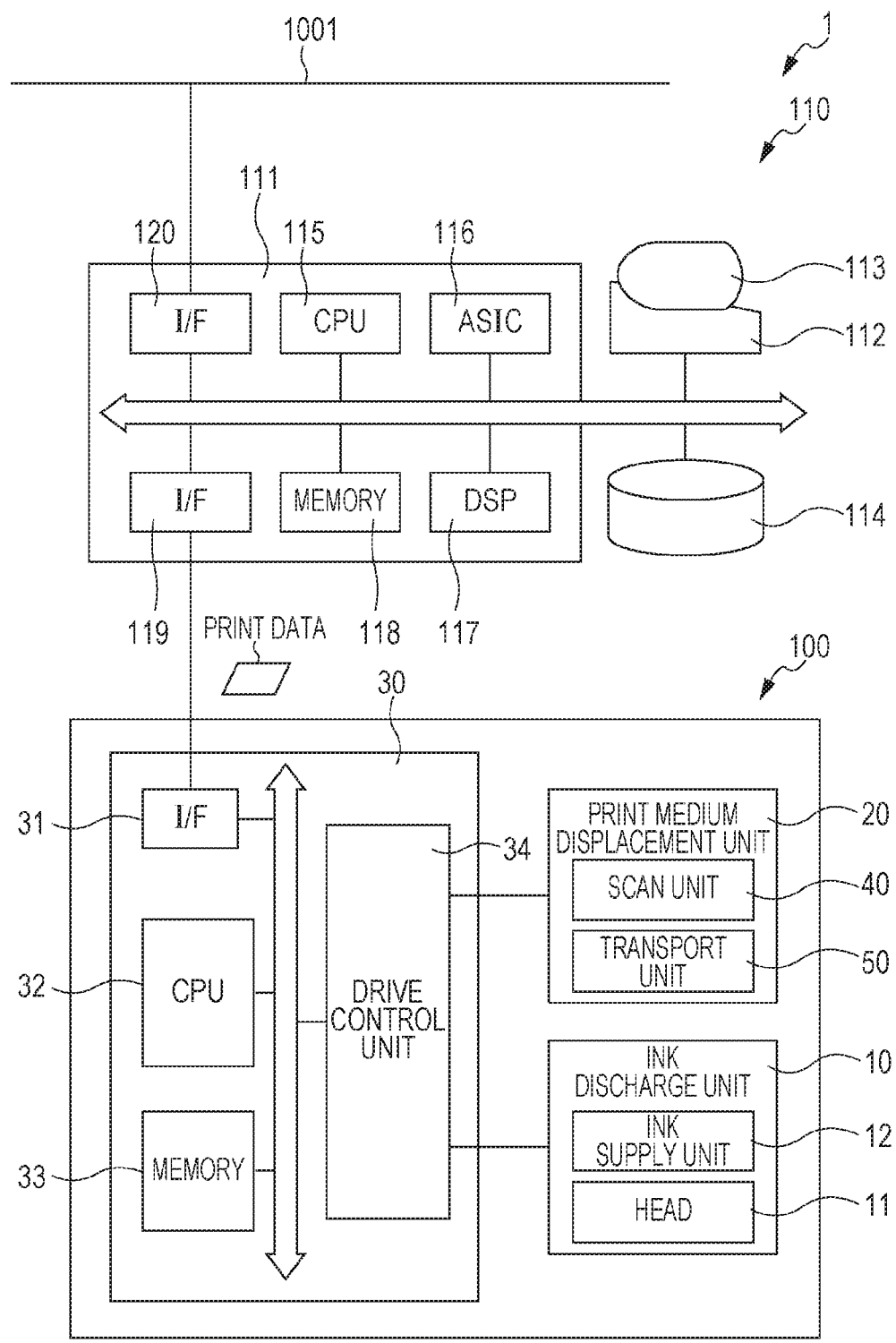
FIG. 3 is a block diagram illustrating the configuration of the printing apparatus.

FIG. 2 is a front view illustrating the configuration of the printing apparatus 1, and FIG. 3 is a block diagram illustrating the configuration of the printing apparatus 1.

The printing apparatus 1 includes a printer 100 serving as a "print unit", a print control device 110 connected to the printer 100, and other components.

The printer 100 is an ink jet printer configured to print a desired image on a print medium 5 that is long and that is supplied in a rolled state. According to a print request received from the print control device 110 or from the PC 3 via the print control device 110, the printer 100 acquires print image data from the storage device 2, and based on the print request and the acquired print image data, the printer 100 performs printing.

The print image data includes image data and/or print data. The image data is general image data (for example, RGB data) or text data obtained from an image capturing device such as a digital camera. The print data is data generated based on the image data and is used to control the printer 100 or to cause the printer 100 to perform printing.

Basic Configuration of Print Controlling Device 110

The print control device 110 includes a control unit 111, a keyboard 112, a display 113, a hard disk drive 114 (hereinafter referred to as an HDD 114) serving as a "storage unit", and other components. The print control device 110 performs centralized management of the entire printing apparatus 1. The centralized management includes, for example, controlling a print request (a print job) causing the printer 100 to perform printing.

Examples of software run by the print control device 110 include software for performing control (which will be described later) characterizing the present embodiment, and additionally include general image processing application software (hereinafter referred to as an application) for handling image data to be printed, and printer driver software (hereinafter referred to as a printer driver) for controlling the printer 100 and generating print data for causing the printer 100 to perform printing.

The control unit 111 includes a central processing unit (CPU) 115, an application specific integrated circuit (ASIC) 116, a digital signal processor (DSP) 117, a memory 118, a printer interface unit 119, a network interface 120, and other components. The control unit 111 controls the print control device 110 and the printer 100.

The HDD 114 stores software (a program run on the control unit 111) run by the print control device 110, an image to be printed, information regarding a print request, and the like.

The memory 118 is a storage medium securing an area in which a program run by the CPU 115 is stored and a work area in which the program is run. The memory 118 includes a memory element such as a RAM and an EEPROM.

The network interface 120 is an interface for connecting the print control device 110 to the private network 1001.

Basic Configuration of Printer 100

The printer 100 includes an ink discharge unit 10, a print medium displacement unit 20, a printer control unit 30, and other components. The printer 100 which has received print data from the print control device 110 controls the ink discharge unit 10 and the print medium displacement unit 20 by the printer control unit 30 and forms (prints) an image on the print medium 5.

The print data is image formation data obtained by converting the image data by using an application and a printer driver included in the print control device 110 to be printable by the printer 100. The print data includes a command for controlling the printer 100.

The ink discharge unit 10 includes a head 11, an ink supply unit 12, and other components.

The print medium displacement unit 20 includes a scan unit 40, a transport unit 50, and other components. The scan unit 40 includes a carriage 41, a guide shaft 42, a carriage motor (not shown), and other components. The transport unit 50 includes a supply unit 51, an accommodation unit 52, a transport roller 53, a platen 55, and other components.

The head 11 includes a plurality of nozzles (a column of nozzles) configured to discharge printing ink as ink drops. The head 11 is mounted on the carriage 41 and reciprocates in a scan direction (X axis direction in FIG. 2) along with the carriage 41 which moves in the scan direction. While moving in the scan direction, the head 11 under the control of the printer control unit 30 discharges ink drops onto the print medium 5 supported by the platen 55, thereby forming a column of dots (raster line) along the scan direction on the print medium 5.

Examples of ink sets of thick ink compositions include an ink set of four colors which includes black (K) ink in addition to an ink set of three colors of cyan (C), magenta (M), and yellow (Y). Moreover, for example, an ink set of eight colors includes in addition to the ink set of four colors, light cyan (Lc) ink, light magenta (Lm) ink, light yellow (Ly) ink, and light black (Lk) ink which are composed of thin ink compositions obtained by reducing the densities of the color materials of the ink set of four colors.

As a system (ink jet system) for discharging ink drops, a piezo system is used as a preferable example. In the piezo system, a piezoelectric element (piezo element) applies pressure according to a print information signal to ink stored in a pressure chamber to eject (discharge) ink drops from the nozzles in communication with the pressure chamber to perform printing.

Note that the system for discharging ink drops is not limited to the piezo system. Other print systems for ejecting ink in liquid drop form to form dot groups on a print medium may be used. The system for discharging ink drops may be, for example: a system in which in a strong electric field between a liquid ejection nozzle (hereinafter referred to as a nozzle) and an acceleration electrode disposed in front of the nozzle, ink is continuously ejected in liquid drop form from the nozzle, and while the ink drops are flying, a print information signal is given from a deflection electrode to perform printing; a system (electrostatic suction system) in which ink drops are ejected according to a print information signal without deflecting the ink drops; a system in which a small pump applies pressure to ink and a nozzle is mechanically vibrated by, for example, a crystal vibrator so as to force ink drops to be ejected; or a system (thermal jet system) in which a microelectrode heats and foams ink according to a print information signal to eject ink drops so as to perform printing.

The print medium displacement unit 20 (the scan unit 40, the transport unit 50) under the control of the printer control unit 30 relatively displaces the print medium 5 with respect to the ink discharge unit 10 (the head 11).

The guide shaft 42 extends in the scan direction and supports the carriage 41 in a state where the carriage 41 is slidably in contact with the guide shaft 42. The carriage motor serves as a drive source when the carriage 41 is reciprocated along the guide shaft 42. That is, the scan unit 40 (the carriage 41, the guide shaft 42, the carriage motor, and other components) under the control of the printer control unit 30 moves the carriage 41 (i.e., the head 11) along the guide shaft 42 in the scan direction.

The supply unit 51 rotatably supports a reel on which the print medium 5 is wound into a roll shape, and the supply unit 51 feeds the print medium 5 to a transport path. The accommodation unit 52 rotatably supports a reel for winding up the print medium 5 and winds up the print medium 5, on which printing has been done, from the transport path.

The transport roller 53 includes a drive roller configured to move the print medium 5 in a transport direction (Y shaft direction in FIG. 2) crossing the scan direction, a driven roller rotated along with the movement of the print medium 5, and other components. The transport roller 53 forms a transport path for transporting the print medium 5 from the supply unit 51 via a print region of the ink discharge unit 10 (a region in an upper surface of the platen 55 in which the head 11 scans and moves) to the accommodation unit 52.

The printer control unit 30 includes an interface unit 31, a CPU 32, a memory 33, a drive control unit 34, and other components and controls the printer 100.

The interface unit 31 is connected to the printer interface unit 119 of the print control device 110 and performs transmission and reception of data between the print control device 110 and the printer 100.

The CPU 32 is a processing unit for controlling the entire printer 100. The memory 33 is a storage medium securing an area in which a program run by the CPU 32 is stored and a work area in which the program is run.

The memory 33 includes a memory element such as a RAM and an EEPROM.

According to a program stored in the memory 33 and print data received from the print control device 110, the CPU 32 controls the print medium displacement unit 20 (the scan unit 40, the transport unit 50) and the ink discharge unit 10 (the head 11, the ink supply unit 12) via the drive control unit 34.

According to the above-described configuration, the printer control unit 30 repeats, onto the print medium 5 fed to the print region by the transport unit 50 (the supply unit 51, the transport roller 53), discharging of ink drops from the head 11 while moving the carriage 41 supporting the head 11 along the guide shaft 42 in the scan direction (X axis direction) and repeats moving of the print medium 5 by the transport unit 50 (the transport roller 53) in the transport direction (+Y direction) crossing the scan direction so as to form (print) a desired image on the print medium 5.

Print Request

In the printing system 1000, printing can be performed by a command from the print control device 110 or by transmitting a print request (a print job) from the PC 3 to the printing apparatus 1 and transferring the print request to an execution phase.

The print request is information regarding a print execution command output to the printer 100 and includes layout information involved in printing, attribute information of print image data (image data and print data) involved in the printing, and image quality information, and information about, for example, a print format, a print medium and the size of the print medium, and the number of copies.

The print request can be registered as a data package in the print control device 110, and the registered print request is stored in the HDD 114 of the print control device 110. Moreover, under the control of the control unit 111, a list of registered print requests can be displayed on a display included in the PC 3 that has accessed the print control device 110 or on the display 113 included in the print control device 110 so as to be selectable by a user. The selected print requests are transferred to an execution phase on a selection screen, thereby being added to a queue and being sequentially printed.

Note that the "display unit" of the invention of the present application corresponds to the display included in the PC 3 and to the display 113 included in the print control device 110.

The attribute information of the print image data included in the print request includes pieces of address information enabling acquisition of image data and print data for forming an image included in a laid out print material from the storage devices 2 storing these pieces of data.

At the time of printing, the print control device 110 acquires the image data or the print data from a corresponding storage device 2 based on the attribute information (address information) of the print image data included in the print request.

When the attribute information of the print image data is attribute information of the image data, and the print control device 110 acquires the image data from the corresponding storage device 2, the print control device 110 (printer driver) generates print data based on the image data.

When the print data is generated, printing is performed according to the print data based on the print request including layout information, and the like. When the attribute information of the print image data is attribute information of the print data, and the print control device 110 acquires the print data from a corresponding storage device 2, printing is performed according to the print data based on the print request including layout information, and the like.

Note that as the size of the image data to be printed increases, generation of the print data takes more processing time. Therefore, when the same print request is repeatedly made, it is preferable that generated print data be stored in a storage device 2 and the storage destination, i.e., the storage device 2, be incorporated as address information into the print request as a data package in advance, and in executing the print request, the stored print data be acquired to allow printing to be performed.

In the printing system 1000, a general-purpose storage device connected to a network, for example, network attached storage (NAS) can be used as the storage device 2. Thus, the printing system 1000 can be more flexibly configured, but depending on used storage devices, operation may be instable, or depending on implementation, a storage device which does not operate constantly may be selected. Moreover, identical print image data may be used by a plurality of users or by a plurality of different print requests. Therefore, in the present embodiment, the control unit 111 serving as a "control unit" of the claimed invention is configured to acquire from the storage device 2, the operation status information of the storage device 2 storing the print image data (image data, print data) and the attribute information of the print image data stored in the storage device 2, and to enable the operation status information and the attribute information to be displayed on a display unit (the display included in the PC 3 or the display 113 included in the print control device 110).

FIG. 4 shows list of print requests displayed on the display of the PC 3. A user can access the printing apparatus 1 (the print control device 110) from the PC 3 to reference the list of the print requests registered in the printing apparatus 1 (the print control device 110).

In the example illustrated in FIG. 4, a list of registered five print requests ("job" 01-05) is displayed on the display of the PC 3 so as to be selectable by a user to perform printing. Each of the print requests is provided with a "name" and is listed up together with its "status", set print "number of copies", required time period for printing, remaining time period until the currently performed printing ends, name of the print medium ("media" name), etc. On the screen, items with underbars can be clicked by using a pointing device such as a mouse on the screen to proceed to a screen for changing settings, and the set contents can be changed. When a "print" button on the right in the screen is pressed by, for example, clicking the button, printing based on the print request of the corresponding row is performed. A "cancel" button can stop printing which is being performed.

For example, the example illustrated in FIG. 4 shows that printing of the job 01 is being performed, the "print" button for the job 02 is pressed, and the job 02 is in a state waiting for the completion of the job 01.

It is shown that the job 03 and the job 04 are in a status (NG) in which prescribed printing cannot be performed due to any cause and a difference in print medium (media).

It is shown that the job 05 is in a status (OK) in which printing can be performed, and when the "print" button is pressed, the job transitions to a print waiting state. Moreover, the alignment of the jobs 01-05 means the order of the jobs in a queue according to which printing is performed. When the job 05 transitions to the print waiting state, the job 05 is moved to and displayed at the position of the job 03. When a user wishes to change the order of the job in the print waiting state, the user clicks the numerical value (02 or 03 in the example of FIG. 4, since 02 and 03 become the print waiting state) of the "job" so as to proceed to a screen for changing the order, and the order can be changed on the screen.

In the printing system 1000, a cause for which the jobs (the job 03 and the job 04 in the example illustrated in FIG. 4) are in a state in which prescribed printing cannot be performed is, for example, that pieces of print image data for printing the jobs cannot be acquired from the storage devices 2 in which the pieces of print image data were stored. A cause for which the pieces of print image data cannot be acquired is, for example, that the storage devices 2 are inaccessible or that the pieces of print image data are inaccessible even when the storage devices 2 are accessible.

In FIG. 4, when, for example, the name (CCC345) of the job 03 is clicked, a property screen of the print request is displayed. From the property screen, pieces of operation status information of the storage devices 2 and pieces of attribute information of the pieces of print image data can be referenced. Note that the name CCC345 is the name of the data package as the print request.

Figure 5:
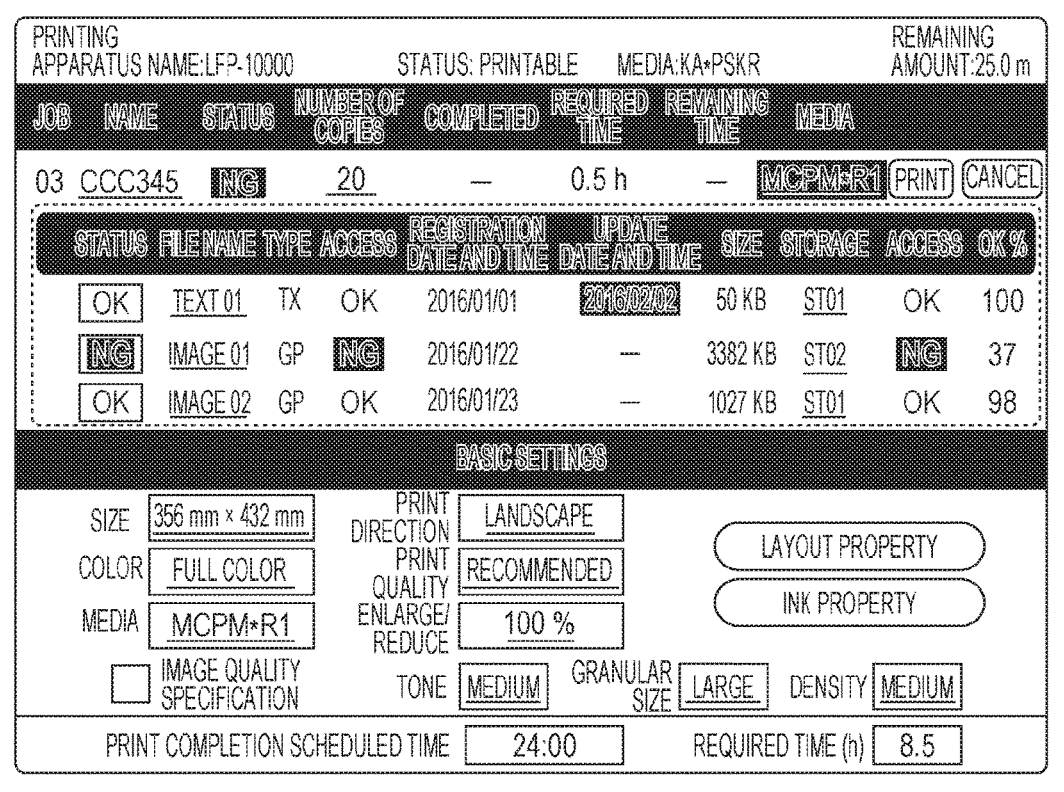

FIG. 5 shows an example of the property screen of the print request.

Two lines of index part from the top of the screen are the same as those of the screen of FIG. 4. The third line is the same as the information of the job 03 (CCC345) of FIG. 4.

Fourth to seventh lines surrounded by a broken line show the pieces of attribute information of the pieces of print image data involved in printing of the job 03 and the pieces of operation status information of the storage devices 2 storing the pieces of print image data. When the cause for which the job 03 is in the status (NG) in which prescribed printing cannot be performed is that one or more of the pieces of print image data are inaccessible, the one or more of the pieces of print image data and the state of the storage devices 2 causing the status (NG) can be referenced.

In eighth to eleventh lines, information regarding "basic settings" for printing is displayed. In these lines, the "layout property" button disposed on the right in the screen is a button for proceeding to a screen for setting a print layout (starting an application for setting the layout of printing), and the "ink property" button is a button for proceeding to a screen for setting ink to be used in the printer 100. Description of the screens for setting the layout and the ink will be omitted.

Last line shows a print completion scheduled time in a case of printing of the job 03 being started now, and a required time period (estimated time) for the job 03.

The pieces of attribute information of the pieces of print image data displayed in fourth to seventh lines surrounded by a broken line are information about the "file name" and the "type"(type representing text data, image data, print data, etc.) of the pieces of print image data, permission/inhibition of "access" to the pieces of print image data (acquisition of data), the "registration date and time" of the pieces of print image data (date and time when the pieces of print image data was first stored as data included in the print request), the "update date and time" in a case of the pieces of print image data having been updated, the "size" of the pieces of print image data, and the like.

The information about permission/inhibition of access to the pieces of print image data (acquisition of data) is displayed, at the time of displaying the list of print requests shown in FIG. 4, as information about success/failure of access attempted by the control unit 111 to the pieces of print image data which are included in each print request (which is specified to be acquired from the storage devices 2).

Moreover, the pieces of operation status information of the storage devices 2 include pieces of information displayed in the fourth to seventh lines surrounded by the broken line and are, for example, information about "storage" (the name of the storage device 2 storing each piece of print image data), "access" (information regarding permission/inhibition of access to the storage device 2), "OK %" (information expressing access success/failure history (success ratio)), and the like.

The information regarding permission/inhibition of access to the storage devices 2 is displayed, at the time of displaying the list of print requests shown in FIG. 4, as information about success/failure of access (e.g., success/failure of packet communication) attempted by the control unit 111 to the storage devices 2 storing the pieces of print image data which are included in each print request (acquisition of the print image data from the storage device 2 is specified).

The control unit 111 stores the information of success/failure of attempted access to the storage devices 2 (i.e., success/failure information about access to the storage devices 2 obtained through communication with the storage devices 2) in the HDD 114, and when displaying the pieces of operation status information of the storage devices 2 on the display unit, the control unit 111 displays access success/failure history information based on the access success/failure information. Specifically, when displaying the pieces of operation status information of the storage devices 2 as illustrated in FIG. 5 on the display unit, the control unit 111 displays the pieces of operation status information as "OK %" (i.e., success ratio of access success/failure up to that time).

Note that the access success/failure history information is not limited to the value of the success ratio of access success/failure until up to that time but may be history information having a meaning when the storage device 2 for storing the print image data is selected. For example, the access success/failure history information may be a value of the success ratio of access success/failure within a range limited to a predetermined period (predetermined time) during which printing is performed or a value of the success ratio of access success/failure during am immediately preceding predetermined period (within one week, within one month, or the like), and information about access success/failure of each day and each hour may be displayed in a diagram, for example, a chart.

"Status" in the upper left corner of an area surrounded by the broken line shows the state of permission/inhibition of acquisition of the pieces of print image data from the storage devices 2. The state in which the pieces of print image data can be acquired from the storage devices 2 is a state in which the storage devices 2 are accessible and specified pieces of print image data in an acquirable state exist in the storage devices 2.

Figures 6, 7:
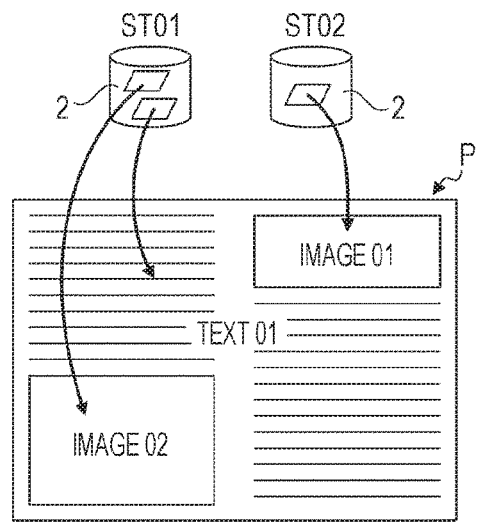
FIG. 6 is a view conceptually illustrating a layout example of a printed material.
FIG. 7 is a view conceptually illustrating a display example of a choice of whether or not to execute printing except for print image data which cannot be acquired.

The example shown in FIG. 5 shows the status (status of acquisition permission/inhibition) of each piece of print image data when a print material P as shown in, for example, FIG. 6 is to be printed.

The print material P shown in FIG. 6 is a print material on which three pieces of print image data which are text 01, an image 01, and an image 02 are laid out, and the text 01 and the image 02 are stored in the storage device 2 (ST01), and the image 01 is stored in the storage device 2 (ST02).

The example illustrated in FIG. 5 shows that the storage device 2 (ST01) is accessible, but the storage device 2 (ST02) is in an inaccessible state. According to the present embodiment, the control unit 111 changes based on the operation status information of the storage device 2, a mode of the operation status information to be displayed on the display unit to be more obvious to a user. Depending on success/failure of attempted access, the mode of displaying of the result is changed. Specifically, access is attempted, and if the access is possible, "OK" is displayed, and if the access is not possible, the mode of display is changed, and "NG" is displayed in an outline character.

It is shown that both the text image 01 and the image 02 stored in the accessible storage device 2 (ST01) are in an accessible state. As an overall "status" determined based on pieces of acquired operation status information of the storage devices 2 and pieces of attribute information of the pieces of print image data, it is displayed that the text 01 and the image 02 can be acquired ("OK") and the image 01 cannot be acquired ("NG").

In the present embodiment, when the control unit 111 displays the attribute information of the print image data stored in the storage device 2 on the display unit, the control unit 111 compares the attribute information with attribute information of the print image data at the time of storing the print image data in storage device 2, and when a difference is found, the control unit displays a warning on the display unit.

Specifically, for example, when there is history that the print image data is updated after "registration date and time" of the pieces of attribute information of the print image data (i.e., when there is a difference in update date and time), the update date and time are displayed on the display unit as a warning display in a manner such that the legibility is enhanced (for example, in outlined character).

In the example illustrated in FIG. 5, a warning display that the data of the text 01 is updated (2016/02/02) after the registration date and time (2016/01/01).

Note that the attribute information of the print image data for comparison is not limited to the update date and time, but any attribute information may be possible as long as it allows confirmation of changes.

Note that, for example, in a case where the storage device 2 and the print image data to be acquired are not accessible, or in a case where the print image data to be acquired has been changed, the state of this case is displayed in the above-described example so that a user can more easily grasp the state, and the mode of display is changed to, for example, outlined character. Icons or alarms corresponding to the states may be displayed or released so that the state is more easily identified and grasped.

In the examples illustrated in FIGS. 4 and 5, it is shown that the type of the print medium 5 (media) on which printing of the job 03 is performed is different from the type of the print medium 5 used for the job 01 which is being printed and the job 02 in a print waiting state. Therefore, to execute the job 03, the print medium 5 has to be changed.

Note that after printing of the job 01 and the job 02 has been completed, and the print medium 5 has been changed, printing of the job 03 can be performed even when the "status" is "NG". The "status" being "NG" means that the pieces of print image data include print image data which cannot be acquired, but a user may want to execute printing even when some parts is not printed.

In the present embodiment, when the printer 100 is caused to perform printing based on pieces of print image data specified by a print request, if the pieces of print image data include print image data which cannot be acquired, the control unit 111 displays on the display unit, a choice of whether or not the printing is executed except for the print image data which cannot be acquired.

Specifically, in the examples illustrated in FIGS. 4 and 5, when the "print" button existing in the line of the job 03 (CCC345) is pressed while the "status" is "NG", a pop-up screen is displayed as illustrated in FIG. 7 and the pop-up screen enables selection of whether or not to execute printing. FIG. 7 shows an example of a screen in a case where the "print" button is pressed with the screen of FIG. 5 being displayed.

In this screen, when the "print" button is pressed, printing without the image 01 (printing of a layout in which the image 01 is blank) is performed. When the "cancel" button is pressed, the pop-up screen disappears, and the previous screen display state is reproduced.

Next, when a user wishes that the print material P be finished inclusively of the image 01, that is, the user wishes the print material P be finished based on the three pieces of print image data which are the text 01, the image 01, and the image 02, the image 01 has to be rendered acquirable. In this case, for example, the image 01 is stored in an accessible storage device 2, and the contents of the print request (data package CCC345) are changed.

FIG. 8 shows an example of a screen for selecting a storage device 2 for storing print image data from the storage devices 2 included in the printing system 1000 (a screen in which change destination storage devices 2 are displayed so as to be selectable by a user. This screen can be displayed by, for example, clicking "ST02" at "storage" representing the storage device 2 for which it is displayed that "access" is "NG" in the screen shown in FIG. 5.

In FIG. 8, to be able to select a more suitable storage device 2, specifications ("product number", name of the storage device 2 ("storage"), "capacity", "available capacity", "usage ratio" etc.), operation status information (for example, "access" showing access permission/inhibition), and access success/failure history information (for example, history (success ratio) "OK %" of access success/failure) of each storage device 2 are also displayed together.

In this screen, a new storage device 2 can be selected by checking a checkbox on the left in the display area surrounded by the broken line. FIG. 8 shows that a check mark is put on a currently selected storage device 2 (ST02).

Moreover, the acquisition source of the print image data to be stored in a newly specified storage device 2 and a folder (save destination) of the new storage device 2 in which the print image data is to be stored are set, and a "store" button is pressed, thereby saving (storing) the specified print image data in the newly selected and specified folder.

At the time of changing the storage device 2 in which the print image data is to be stored, if the storage device 2 before the change is accessible, the control unit 111 records link information enabling access to a change destination storage device 2 in the storage device 2 before the change. If the storage device 2 before the change is inaccessible, the link information is temporarily recorded as change history information of the storage device 2 in the HDD 114, and when the storage device 2 before the change becomes accessible, the link information is recorded in the storage device 2 before the change.

In this way, even when the storage device 2 before the change is accessed according to another print request using the print image data whose storage destination has been changed, it is possible to access a storage device 2 newly selected as a storage destination, and therefore, the required print image data can be acquired.

Moreover, when the storage device 2 before the change is accessed according to another print request and the link information is read, the control unit 111 updates based on the link information, address information of the storage device in which the print image data included in the print request is to be stored to address information of the change destination storage device 2.

The function of the above-described control unit 111 can be easily configured as software which functions through the operation of the CPU 115.

Moreover, a "print control device" is not limited to the print control device 110 realized by software but may be, for example, a print control device configuring the function of the control unit 111 by hardware or firmware as long as it includes acquiring pieces of operation status information of storage devices storing pieces of print image data specified by a print request and the pieces of attribute information of the pieces of print image data from the storage devices, and displaying the operation status information and the attribute information for each pieces of print image data on the display as a "print control method" to perform its function.

As described above, the print control device, the printing apparatus, and the print control method according to the present embodiment provide the following advantages.

The control unit 111 acquires from the storage device 2, the operation status information of the storage device 2 storing the print image data and the attribute information of the print image data stored in the storage device 2 and enables the operation status information and the attribute information to be displayed on the display unit. Therefore, displaying these pieces of information on the display unit and referencing these pieces of information enable determination of whether or not the print image data can be acquired and whether or not the print image data to be acquired is desired data. That is, it is possible to determine whether or not printing can be performed based on the desired print image data. Before printing is performed, a user is informed of whether or not the printing can be performed based on the print request, which improves the convenience of the user.

The control unit 111 changes based on the operation status information, a mode of the operation status information to be displayed on the display unit. Therefore, for example, information about whether or not print image data can be acquired becomes more legible, which improves the convenience of a user.

When the control unit 111 displays the attribute information of the print image data on the display unit, the control unit compares the attribute information (the attribution information of print image data stored in the storage device 2) with attribute information of the print image data at the time of storing the print image data in the storage device 2, and when a difference is found, the control unit displays a warning on the display unit. That is, a warning is displayed, for example, when the print image data has been changed. Therefore, before printing is performed, an appropriate determination on the printing can be made, which improves the convenience of a user.

When the control unit 111 displays the operation status information of the storage device 2 on the display unit, the control unit displays access success/failure history information based on the success/failure information about access to the storage device 2. Therefore, before printing is performed, an improvement, for example, changing a storage device 2 for storing the print image data to a more stably operating storage device 2, can be made to stably perform the printing.

When the printer 100 is caused to perform printing based on the print image data including pieces of print image data specified by the print request, if the pieces of print image data include print image data which cannot be acquired, the control unit 111 displays on the display unit, a choice of whether or not to cause the print unit to perform the printing except for the print image data which cannot be acquired. Therefore, printing unexpected by a user (printing an image with some parts of the image unexpectedly excluded) is no longer performed, and it is also possible to support a case where a user wishes to cause the print unit to perform printing even when some parts of the image is not to be printed. This improves the convenience of a user.

When the storage device 2 for storing the print image data is changed, the control unit 111 records in the storage device 2 before the change, link information enabling access to a change destination storage device 2. Therefore, even when the storage device 2 for storing the print image data is changed, such a change does not affect printing according to another print request for printing by specifying the print image data.

The control unit 111 updates based on the link information allowing access to the change destination storage device 2, address information of the storage device 2 for storing the print image data included in the print request to address information of the change destination storage device 2. Therefore, the information of the print request can be changed to appropriate contents without making a user conscious of it.

Moreover, a print controlling method performed by the print control device 110 having the function of the control unit 111 includes acquiring pieces of operation status information of storage devices 2 in which pieces of print image data specified by print requests are stored and pieces of attribute information of the pieces of print image data from the storage devices 2, and displaying the operation status information and the attribute information for each of the pieces of print image data on a display unit. The operation status information of the storage device 2 storing the print image data specified by the print request and the attribute information of the print image data stored in the storage device 2 are displayed on the display unit. Therefore, by referencing these pieces of information, it is possible to determine whether or not the print image data can be acquired and whether or not the print image data to be acquired is desired data. That is, it is possible to determine whether or not printing can be performed based on the desired print image data. Before printing is performed, a user is informed of whether or not the printing can be performed based on the print request, which improves the convenience of the user.

The printer 1 includes the printer 100 configured to perform printing based on print image data obtained from the storage device 2 according to a print request, and the above-described print control device 110. Before printing is performed, a user is informed of whether or not the printing can be performed based on the print request, which improves the convenience of the user.

What is claimed is:

1. A print control device, comprising:
   a processor configured to acquire print image data from a plurality of storage devices according to a print request and to cause a printer which performs printing based on the print image data to perform the printing,
   wherein the processor
   acquires operation status information of the storage device storing the print image data, attribute information of the print image data stored in the storage device, and access success/failure information,
   enables the operation status information, the attribute information, and a success ratio of access per the storage device based on the access success/failure information to be displayed on a display, and
   if one or more pieces of print image data cannot be acquired, displays a choice of whether to perform the printing while excluding the one or more pieces of print image data that cannot be acquired.

2. The print control device according to claim 1, wherein the processor changes a mode of the operation status information to be displayed on the display based on the operation status information.

3. The print control device according to claim 1, wherein when the processor displays the attribute information of the print image data stored in the storage device on the display unit, the processor compares the attribute information of the print image data with attribute information of the print image data at the time of storing the print image data in the storage device, and when a difference is found, the processor displays a warning on the display.

4. The print control device according to claim 1, wherein when the storage device for storing the print image data is changed, the processor records link information enabling access to a change destination storage device in the storage device before the change.

5. The print control device according to claim 4, wherein the processor updates address information of the storage device for storing the print image data included in the print request to address information of the change destination storage device based on the link information.

6. A printing apparatus comprising:
   a printer configured to perform printing based on print image data obtained from a storage device according to a print request; and
   the print control device according to claim 1.

7. A printing apparatus comprising:
   a printer configured to perform printing based on print image data obtained from a storage device according to a print request; and
   the print control device according to claim 2.

8. A printing apparatus comprising:
   a printer configured to perform printing based on print image data obtained from a storage device according to a print request; and
   the print control device according to claim 3.

9. A printing apparatus comprising:
   a printer configured to perform printing based on print image data obtained from a storage device according to a print request; and
   the print control device according to claim 4.

10. A printing apparatus comprising:
    a printer configured to perform printing based on print image data obtained from a storage device according to a print request; and
    the print control device according to claim 5.

11. A print control method, comprising: acquiring pieces of operation status information of a plurality of storage devices in which pieces of print image data specified by print requests are stored, pieces of attribute information of the pieces of print image data from the storage devices, and access success/failure information,
    displaying the operation status information, the attribute information for each of the pieces of print image data, and a success ratio of the access per the storage device based on the access success/failure information on a display, and if one or more pieces of print image data cannot be acquired, displaying a choice of whether to perform the printing while excluding the one or more pieces of print image data that cannot be acquired.

* * * * *